United States Patent
Kim

(10) Patent No.: US 8,219,910 B2
(45) Date of Patent: Jul. 10, 2012

(54) HOST DEVICE TO INSTALL DRIVER AND METHOD THEREOF

(75) Inventor: Young-gu Kim, Suwon-si (KR)

(73) Assignee: Samsung Elecronics Co., Ltd., Suwon-si (KR)

(*) Notice: Subject to any disclaimer, the term of this patent is extended or adjusted under 35 U.S.C. 154(b) by 861 days.

(21) Appl. No.: 11/964,906

(22) Filed: Dec. 27, 2007

(65) Prior Publication Data

US 2009/0013251 A1 Jan. 8, 2009

(30) Foreign Application Priority Data

Dec. 28, 2006 (KR) .................. 10-2006-0136049

(51) Int. Cl.
*G06F 3/00* (2006.01)
*G06F 9/445* (2006.01)

(52) U.S. Cl. ........ 715/705; 715/764; 715/772; 719/327; 717/174

(58) Field of Classification Search .................. 715/764, 715/772, 705; 719/327; 717/174; 347/16
See application file for complete search history.

(56) References Cited

U.S. PATENT DOCUMENTS

| | | | |
|---|---|---|---|
| 5,727,205 A * | 3/1998 | Bell et al. | 1/1 |
| 6,744,450 B1 * | 6/2004 | Zimniewicz et al. | 715/841 |
| 6,910,208 B1 * | 6/2005 | Zimniewicz | 717/174 |
| 2002/0059372 A1 * | 5/2002 | Goshev et al. | 709/203 |
| 2003/0051069 A1 * | 3/2003 | Iida | 709/321 |
| 2003/0098865 A1 * | 5/2003 | Alegria et al. | 345/473 |
| 2004/0001238 A1 * | 1/2004 | Leja et al. | 358/474 |
| 2004/0006766 A1 * | 1/2004 | Kim | 717/174 |
| 2004/0102976 A1 * | 5/2004 | Pochueva | 704/270.1 |
| 2004/0193745 A1 * | 9/2004 | Olbricht | 710/8 |
| 2005/0183095 A1 * | 8/2005 | Kujirai | 719/321 |
| 2006/0037029 A1 * | 2/2006 | Yamada | 719/327 |
| 2006/0150031 A1 * | 7/2006 | Asauchi | 714/46 |
| 2007/0003307 A1 * | 1/2007 | Maheshwari | 399/81 |

* cited by examiner

*Primary Examiner* — Tadeese Hailu
(74) *Attorney, Agent, or Firm* — Stanzione & Kim, LLP

(57) ABSTRACT

A host device to install a driver and a driver installing method thereof. The host device includes a user interface to provide a step-by-step setup screen to install a driver of an external device and a setup method screen to inform a setup method of the step-by-step setup screen, and receives a selection signal with respect to the step-by-step setup screen, and a driver installer to install the driver according to the selection signal input through the user interface.

19 Claims, 7 Drawing Sheets

HOST DEVICE TO INSTALL DRIVER AND METHOD THEREOF

CROSS-REFERENCE TO RELATED APPLICATIONS

This application claims priority under 35 U.S.C. §119 (a) from Korean Patent Application No. 2006-136049, filed on Dec. 28, 2006, the contents of which are incorporated herein by reference in its entirety.

BACKGROUND OF THE INVENTION

1. Field of the Invention

The present general inventive concept relates generally to a host device to install a driver and a driver installing method of the host device. More particularly, the present general inventive concept relates to a host device enabling any body to easily install a driver and a driver installing method of the host device.

2. Description of the Related Art

Mostly, various peripheral devices are connected to a host device such as a computer. After connecting the peripheral device to the host device, a driver program needs to be installed to the host device to operate the connected peripheral devices.

Manufacturers of the peripheral devices store driver programs of the respective peripheral devices in portable storage media, such as CD-ROM, and provide the stored driver programs to users who purchase the peripheral devices.

To use the peripheral device, the user has to connect the peripheral device to the host device and install the corresponding driver program to the host device. The user can install the driver program using the portable storage medium provided together with the peripheral device or using a software installation wizard provided from an operating system (OS).

FIGS. 1A through 1H are views of a conventional software installation wizard.

FIGS. 1A through 1H show a method using a software installation wizard provided from an operating system. In general, the software installation wizard is a program to help a user easily install the corresponding program to use the peripheral device, and progresses step by step as illustrated in FIGS. 1A through 1H.

As illustrated in FIGS. 1A through 1H, the software installation wizard provides separate windows for the respective setup installation steps. In the window, a "Next" or "Back" button is provided to proceed to a next step or a previous step.

Although the software installation wizard is the program to help the software installation, the user who sees the software installation wizard for the first time, experiences much difficulty in selecting the several steps in person because of unfamiliar terms in the user interface (UI).

In many cases, the software installation wizard leads to select a suitable option from several options as illustrated in FIGS. 1B and 1C. It is quite difficult for not only the beginner but also the experienced user of the software installation wizard to make such choices.

Particularly, if the corresponding driver program is not normally installed to the host device because of the user's inappropriate selection and setup, further installation may be infeasible. Until the normal installation of the driver program is completed, the driver program cannot be installed, and the software driver program may be installed repeatedly.

SUMMARY OF THE INVENTION

The present general inventive concept provides a host device to address difficulties in installing a driver by displaying a setup method relating to the driver installation in a separate window when the driver is being installed, and a driver installing method of the host device.

The present general inventive concept provides a host device to inform a user of how to enter a signal, select a key, or setup data through the setup screen to install a driver Additional aspects and utilities of the present general inventive concept will be set forth in part in the description which follows and, in part, will be obvious from the description, or may be learned by practice of the general inventive concept The foregoing and/or other aspects and utilities of the present general inventive concept may be achieved by providing a host device to install a driver, the host device including a user interface to provide a step-by-step setup screen to install a driver of an external device and a setup method screen to inform a setup method of the step-by-step setup screen, and receives a selection signal with respect to the step-by-step setup screen; and a driver installer to install the driver according to the selection signal input through the user interface.

The user interface may provide the step-by-step setup screen in a form of installation wizard for the driver installation.

In a screen divided to a plurality of regions, the user interface may display the step-by-step setup screen in a first region of the divided regions and the setup method screen in a second region.

The setup method screen may be moving pictures to inform of a setup method relating to the step-by-step setup screen.

The user interface may repeatedly display a setup method screen relating to the step-by-step setup screen displayed in the first region when the selection signal for the step-by-step setup screen is not input.

The user interface may further provide icons to select Maximize, Minimize, and Close with respect to the setup method screen in the second region.

The user interface may extend and display the setup method screen all over the first and second regions when the Maximize icon selection signal is input, and the user interface may extend and display the setup screen all over the first and second regions when either the Minimize icon or the Close icon selection signal is input.

The user interface may display a setup method screen showing hardware information of the external device from various angles when the step-by-step setup screen displayed in the first region relates to a hardware setup of the external device.

The user interface may further provide a screen change icon to select to change the setup method screen, and the user interface may display a setup method screen from a different angle from the setup method screen displayed in the second region when a screen change icon selection signal is input.

The foregoing and/or other aspects and utilities of the present general inventive concept may also be achieved by providing a driver installing method which includes providing a step-by-step setup screen to install a driver of an external device and a setup method screen to inform a setup method of the step-by-step setup screen; receiving a selection signal with respect to the step-by-step setup screen; and installing the driver in accordance to the input selection signal.

The step-by-step setup screen may be provided in a form of installation wizard for the driver installation.

The providing may comprise dividing a screen into a plurality of regions; and displaying the step-by-step setup screen in a first region of the divided regions and displaying the setup method screen in a second region of the divided regions.

The setup method screen may be moving pictures for informing of a setup method relating to the step-by-step setup screen.

The driver installing method may further include repeatedly displaying a setup method screen relating to the step-by-step setup screen displayed in the first region when the selection signal for the step-by-step setup screen is not input in the selection signal receiving operation.

The step-by-step setup screen and the setup method screen providing operation may further provide icons to select Maximize, Minimize, and Close with respect to the setup method screen in the second region.

The step-by-step setup screen and the setup method screen providing operation may extend and display the setup method screen all over the first and second regions when the Maximize icon selection signal is input, and the step-by-step setup screen and the setup method screen providing operation may extend and display the setup screen all over the first and second regions when either the Minimize icon or the Close icon selection signal is input.

The step-by-step setup screen and the setup method screen providing operation may display a setup method screen which shows hardware information of the external device from various angles when the step-by-step setup screen displayed in the first region relates to a hardware setup of the external device.

The step-by-step setup screen and the setup method screen providing operation may further provide a screen change icon to select to change the setup method screen, and the step-by-step setup screen and the setup method screen providing operation may display a setup method screen from a different angle from the setup method screen displayed in the second region when a screen change icon selection signal is input.

The foregoing and/or other aspects and utilities of the present general inventive concept may also be achieved by providing a computer-readable medium containing computer-readable codes as a program to perform a method of providing a step-by-step setup screen for installing a driver of an external device and a setup method screen for informing a setup method of the step-by-step setup screen, receiving a selection signal with respect to the step-by-step setup screen, and installing the driver according to the selection signal input through the user interface.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
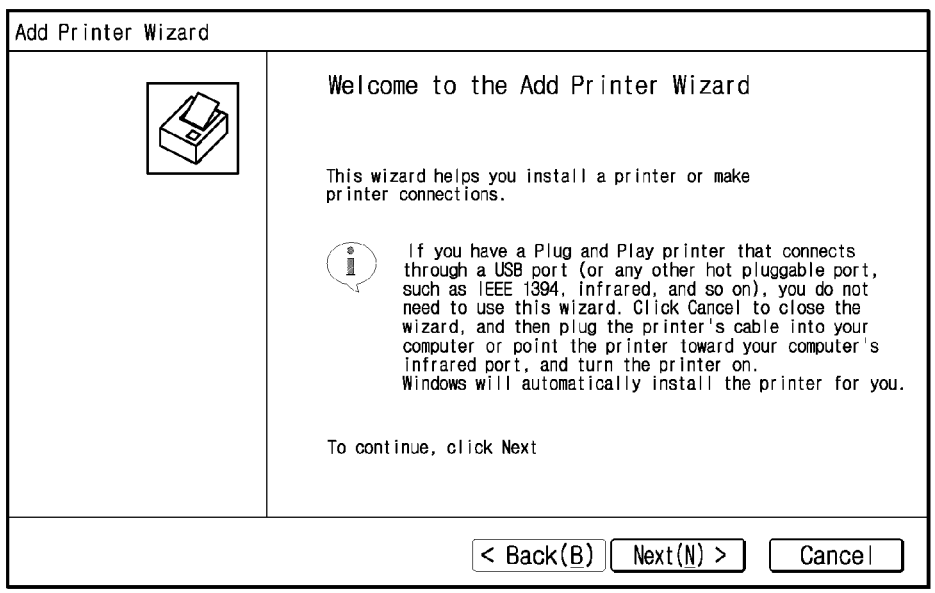
FIGS. 1A through 1H are view illustrating a conventional software installation wizard.
Figure 1B:
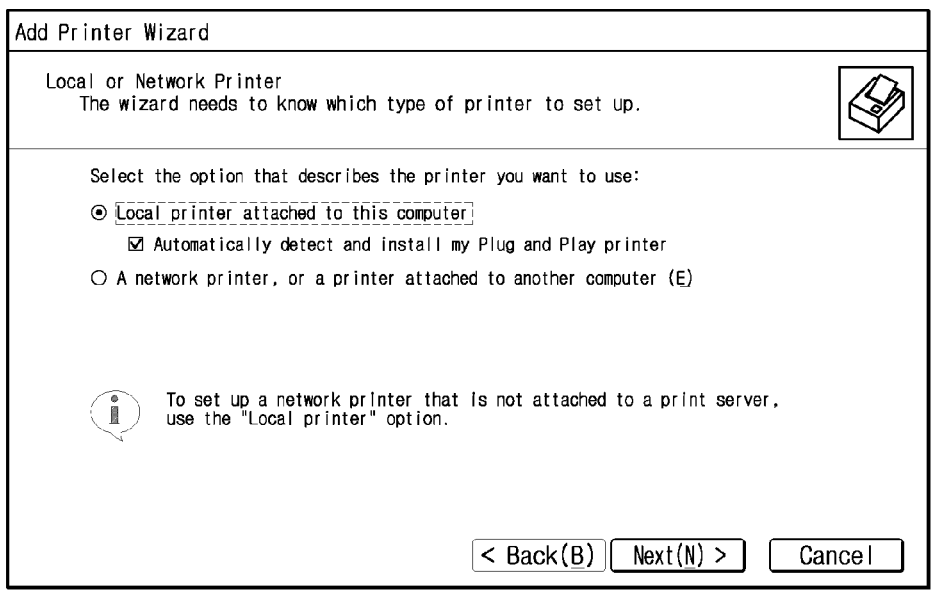
Figure 1C:
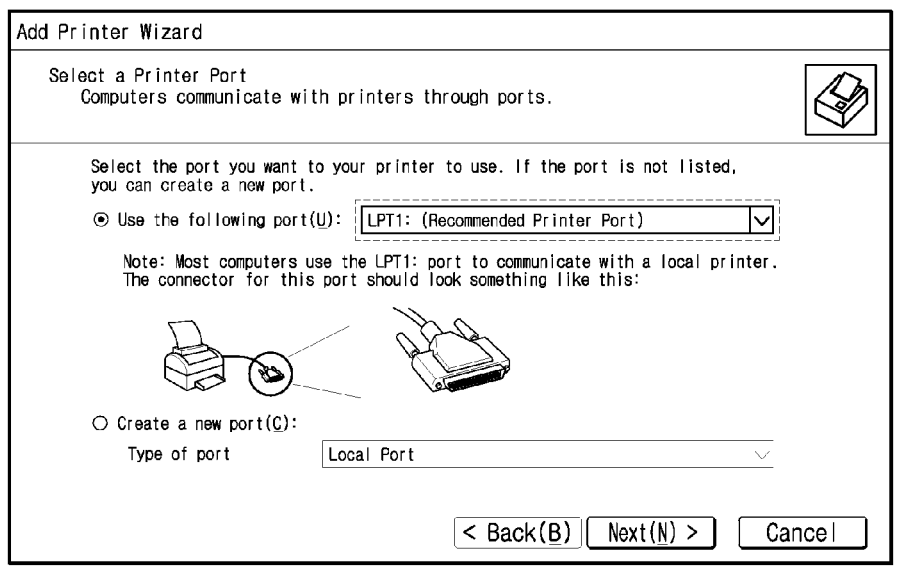
Figure 1D:
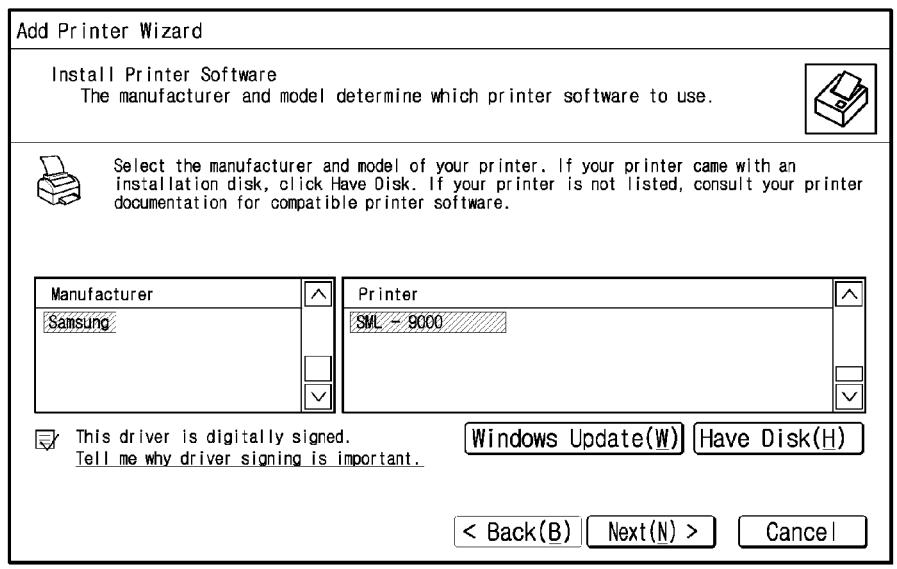
Figure 1E:
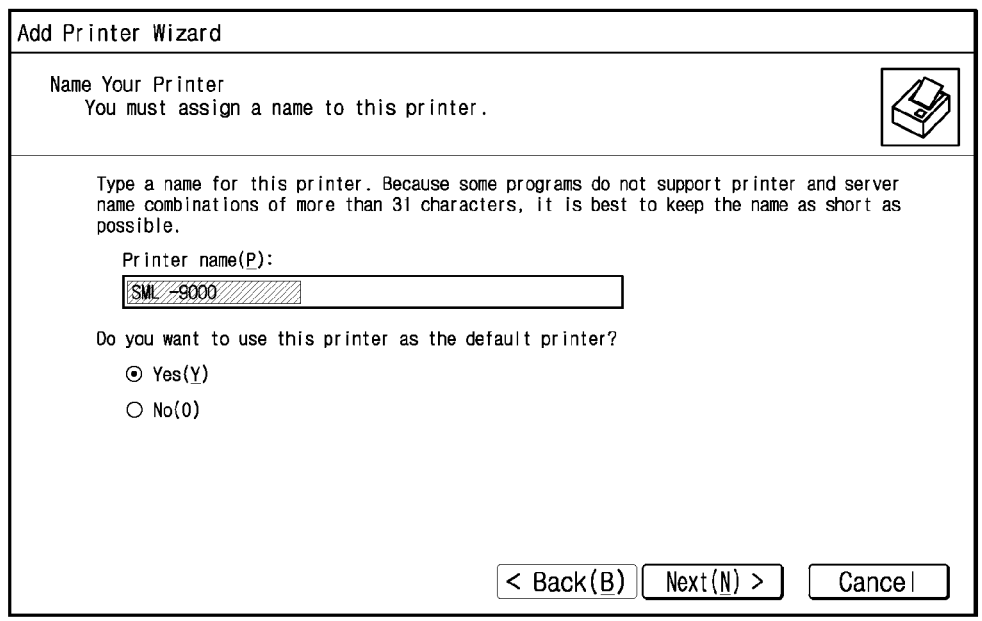
Figure 1F:
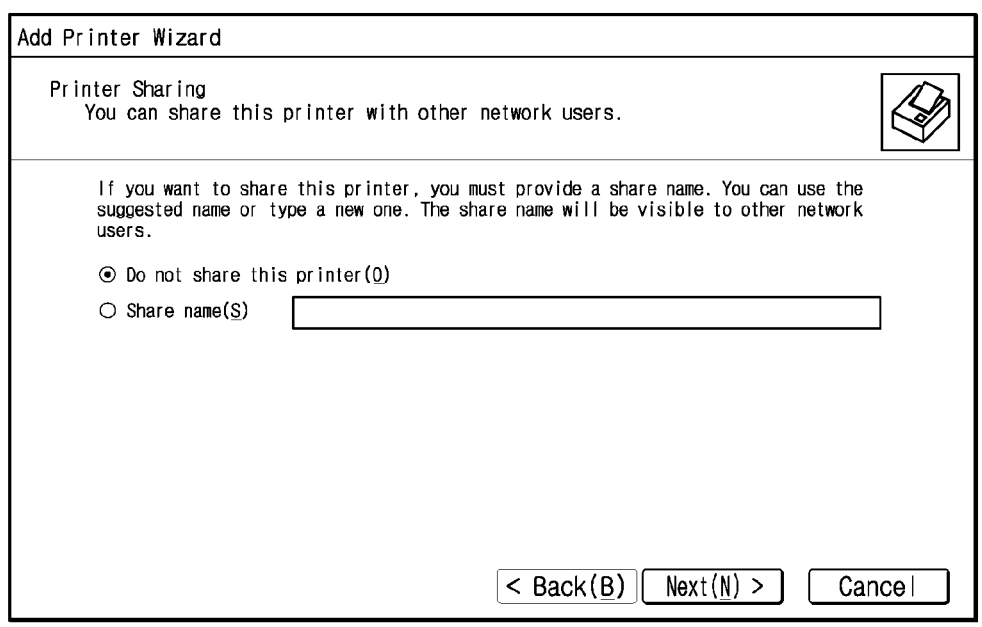
Figure 1G:
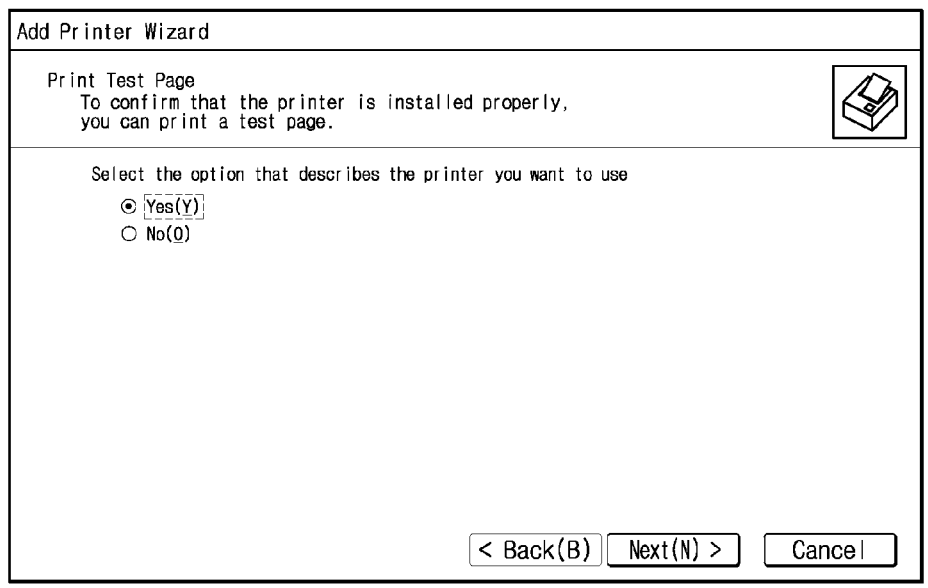
Figure 1H:
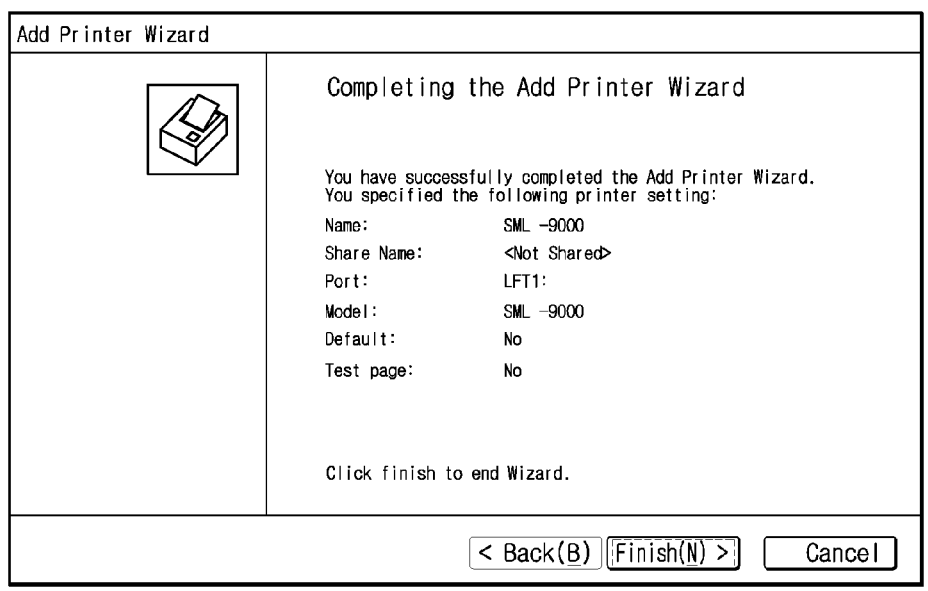

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
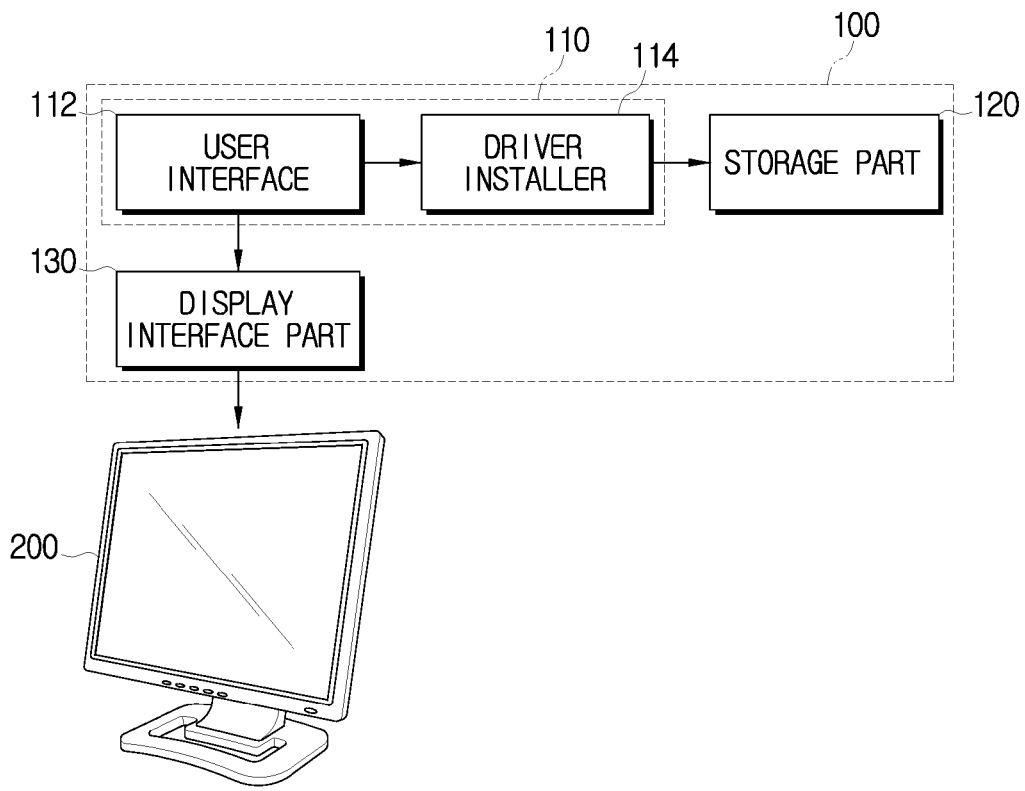
FIG. 2 is a block diagram illustrating a host device according to an embodiment of the present general inventive concept.

FIG. 2 is a block diagram illustrating a host device according to an embodiment of the present general inventive concept.

The host device of FIG. 2 includes a driver installation program part 110, a storage part 120, and a display interface part 130. The host device 100 is connected to a peripheral device, such as a display device 200 and/or an external device (not illustrated).

The host device 100 can be a personal computer, and the external device can be another peripheral device, such as a multifunction machine, a printer, or an image forming apparatus. A driver of the peripheral device, such as the multifunction machine or the printer, can be installed to the host device 100 by the driver installation program part 110.

The driver installation program part 110 is a program to install a driver, which controls an external device used in connection with the host device 100, to the host device 100. Herein, the driver is a program requisite to control the external device at the host device 100 and is stored to the storage part 120 by the driver installation program part 110.

The driver installation program part 110 has a file "Setup.exe" to setup data to install the driver. When a user executes the "Setup.exe" file using the host device 100, the driver installation program part 100 is activated.

The driver installation program part 110 includes a user interface 112 and a driver installer 114.

The user interface 112 provides one or more step-by-step setup screens for the driver installation with respect to the external device connected to the host device 100. In doing so, the step-by-step setup screens may be a conventional Install Wizard format.

Accordingly, the step-by-step setup screen provided from the user interface 112 includes a "Next" or "Back" button to progress setup screens step by step.

The user interface 112 receives a selection signal with respect to the step-by-step setup screen from the user through the step-by-step setup screen. The selection signal for the step-by-step setup screen can include a selection signal for selecting one of the options required in the step-by-step setup screen, and a selection signal for moving to the next or previous setup screen.

Together with the step-by-step setup screen, the user interface 112 provides a setup method screen to inform of a setup method of the step-by-step setup screen. The setup method screen provided from the user interface 112 may be one or more moving pictures (motion pictures) produced to facilitate the setup method of the step-by-step setup screen.

Specifically, the setup method screen provided from the user interface 112 shows the user the moving pictures which explains which one of the several options is to be selected, or which button is to be selected to proceed to the next step.

When the user interface 112 provides the setup method screen as the moving pictures, the setup screens provided from the user interface 112 may be more efficient than screens relating to the hardware setup of the external device.

The moving pictures may include one or more still images and one or more moving images displayed in a window of the setup method screen. When the step-by-step setup screen includes a first number of step-by-step setup screens, the setup method screen may include a second number of setup method screens. Each or some of the setup method screens may have one or more motion pictures to show or instruct the user how to enter or select date or key signal. The second number is equal to or less than the first number. The step-by-step setup screen and the setup method screen may be simultaneously displayed in the same window of the display device 200. The step-by-step setup screen and the corresponding setup method screen may be replaced by a next step-by-step setup screen and a corresponding next setup method screen upon receiving a signal from a user, the display device 200, or the host device 100, so as to receive a selection signal for selecting one of the options required in the step-by-step setup screen, and a selection signal for moving to the next or previous step-by-step setup screen and/or the next or previous setup method screen, and to display instructions or explanations on the step-by-step setup screen.

In detail, when various cables, such as USB cables and power cables, are used to connect the external device to the host device 100, error generating in the cable connection can be prevented by showing the hardware state of the external device and the cable connection method using the moving pictures. At this time, it is preferred to configure to show the moving pictures relating to the hardware state from various angles.

The user interface 112 can inform the user of how to select options or keys by displaying an easily identified form, for example, a mouse pointer in the portion requiring the user's selection.

When the selection signal for the step-by-step setup screen is not input, the user interface 112 repeatedly displays the setup method screen relating to the current step-by-step setup screen. Hence, the user interface 112 can guide or instruct the user to input a selection signal for the step-by-step setup screen.

The user interface 112 can further provide icons enabling to select a Maximize, a Minimize, and a Close, and screen change icons in relation to the setup method screen, in the setup method screen.

When a selection signal corresponding to the Maximize icon is input among the Maximize, Minimize, and Close icons, the user interface 112 displays the setup method screen by expanding a size or area of the setup method screen up to cover the displayed setup screen, or by maximizing the setup method screen.

When the selection signal of either the Minimize icon or the Close icon among the Maximize, Minimize, and Close icons is input, the user interface 112 displays the setup screen by expanding a size or area of the setup screen up to cover the displayed setup method screen or by minimizing or hiding the setup method screen.

When the Minimize icon selection signal is input, the driver installation program part 110 may continue operating the moving pictures of the setup method screen without stopping operating or freezing the corresponding moving picture, and may process not to display the moving pictures, of which operation are continued, on the screen. Since the user may often want to view the setup method screen again after selecting the Minimize of the setup method screen, the setup method screen corresponding to the current setup screen can be immediately provided.

The step-by-step setup screen is displayed in a first area of the window of the display device 200, and the setup method screen is displayed in a second area of the window of the display device 200. When one of the Minimize icon and the Maximize icon is selected, the second display area of the setup method screen is changed between a first size or area (minimized size or area) and a second size or area (maximized size or area). The first size or area may be referred to as a minimized size or area, and the second size or area may be referred to as a maximized size or area. The maximized size or area may cover a portion or all of the first area of the step-by-step setup screen, so that the portion or all of the first area may not be seen.

When the Close icon selection signal is input, the driver installation program part 110 processes not to display the setup method screen and to stop operating the moving pictures of the setup method screen. This case may correspond to a case where the driver is installable even when the setup method screen is not provided to the user any more. When the setup method screen is closed, the driver installation can be carried out more rapidly by assuring the resource of the host device.

The step-by-step setup screen may be referred to as setup screen. The setup screen and the setup method screen provided from the user interface 112 are fed to the display device 200 through the display interface part 130, so that the display device 200 outputs the screens.

The driver installer 114 installs the driver to the storage part 120 of the host device 100 according to the selection signal input through the user interface 112. Here, the selection signal input through the user interface 112 relates to options in the driver installation to the host device 100 and includes selection signals as to various options such as installation location and installation range of the driver. That is, the driver installer 114 installs the driver to the storage part 120 of the host device 100 according to the options selected by the user.

As illustrated in FIG. 2, the storage part 120 is a main storage unit of the host device 100, and drivers of various external devices can be installed to the storage part 120. In this exemplary embodiment, the driver is installed and stored to the storage part 120 by the driver installer 114. The storage part 120 can be a hard disk drive (HDD), a solid state drive (SSD), etc.

The display interface part 130 supports the interface between the host device 100 and the display device 200 and provides information to be displayed from the user interface 112, that is, the setup screens and the setup method screens to the display device 200.

The display device 200, which is used in connection with the host device 100, outputs the information provided from the display interface part 130. Accordingly, the display device 200 can display the setup screen and the setup method screen.

Figure 3:
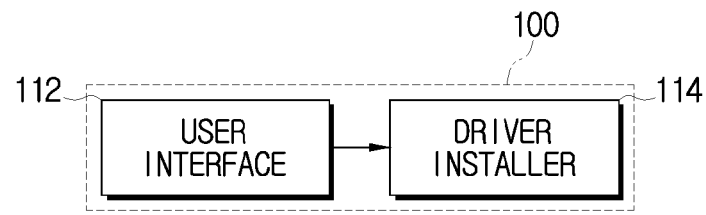
FIG. 3 is a block diagram illustrating a host device according to another embodiment of the present general inventive concept.

FIG. 3 is a block diagram illustrating a host device according to another exemplary embodiment of the present general inventive concept.

While the host device 100 of FIG. 2 includes the driver installation program part 110, the storage part 120, and the display interface part 130, the host device 100 of FIG. 3 includes only a user interface 112 and a driver installer 114.

The user interface 112 provides step-by-step setup screens for installing a driver of an external device and setup method screens for informing setup methods of the step-by-step setup screens, and receives selection signals for the step-by-step setup screens.

The driver installer 114 installs the driver to the storage part 120 according to the selection signals input through the user interface 112.

The user interface 112 and the driver installer 114 of FIG. 3 have the same functions and the same reference numerals as the user interface 112 and the driver installer 114 of FIG. 2, and thus their further descriptions shall be omitted.

Figure 4:
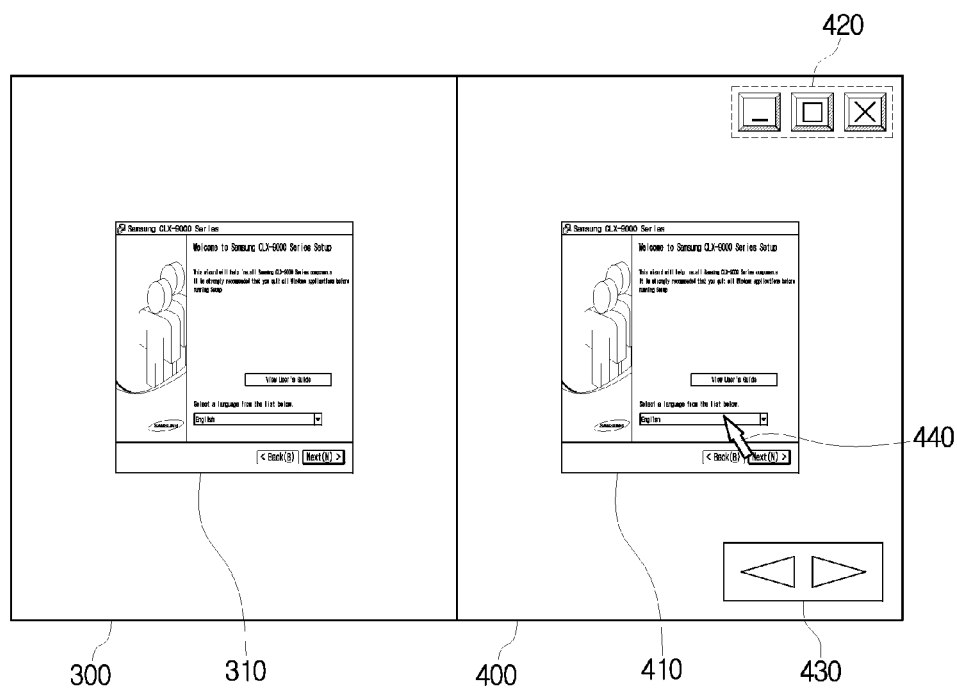
FIG. 4 is a view illustrating an installation screen and a setup method screen provided by the host device according to an embodiment of the present general inventive concept.

FIG. 4 is a view illustrating an installation screen (setup screen) 310 and a setup method screen 410 provided by a host device according to an embodiment of the present general inventive concept.

Referring to FIGS. 1-4, in order to display the setup screen 310 and the setup method screen 410 provided from the user interface 112 at the same time, the display device 200 divides a screen to a plurality of regions, for example, a first region 300 and a second region 400.

The user interface 112 provides the setup screen 310 and the setup method screen 410 so as to display the setup screen 310 and the setup method screen 410 in the divided regions, respectively.

In FIG. 4, the display device 200 displays the setup screen 310 and the setup method screen 410 by dividing a screen to two regions by way of example. The setup screen 310 is displayed in the first region 300 and the setup method screen 410 is displayed in the second region 400. The setup method screen shows a selection process of how to place or move a cursor, and how to select or enter a key or button, or shows an informing process of informing a user of information on the key or button or information on definition of terms of the setup screen.

The first region 300 displays the step-by-step setup screen 310 in the Install Wizard form to install the driver of the external device, and the second region 400 displays the setup method screen 410 to inform the setup method of the setup screen 310 displayed in the first region 300.

As illustrated in FIG. 4, the setup method screen 410 displayed in the second region 400 may be the same as the step-by-step setup screen 310 displayed in the first region 300. Yet, the user's selection can be induced by displaying a mouse pointer 440 on the setup method screen 410 at a position corresponding to the portion requiring the user's selection in the step-by-step setup screen 310.

It is advantageous to further display icons 420 for selecting Maximize, Minimize, and Close, and a screen change icon 430 in the second region 400, as well as the setup method screen 410.

When the Maximize icon is selected among the icons 420 for selecting the Maximize, the Minimize, and the Close in the second region 400, the driver installation program part 110 processes to display the setup method screen 410 by maximizing or expanding the setup method screen 410 all over the first region 300 and the second region 400.

When the Minimize or the Close icon is selected among the icons 420 for selecting the Maximize, the Minimize, and the Close in the second region 400, the driver installation program part 110 processes to minimize or extend and display the setup screen 310 all over the first region 300 and the second region 400.

When the screen change icon 430 in the second region 400 is selected, the second region 400 can show a previous setup method screen or the current setup method screen 410 at a different angle.

In this exemplary embodiment of the present general inventive concept, one screen is divided to two regions, but not limited to two regions. For instance, one screen can be divided to three regions: one region displaying the setup screen 310, another region displaying the setup method screen 410, and the other region displaying notice or useful information to inform the user.

Figure 5:
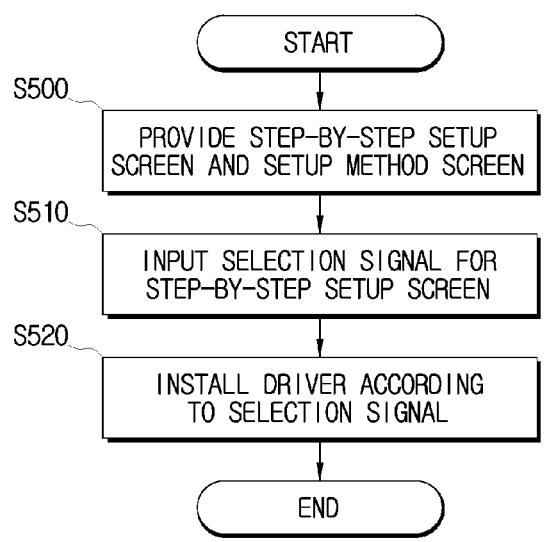
FIG. 5 is a flowchart illustrating a driver installing method according to an embodiment of the present general inventive concept.

FIG. 5 is a flowchart illustrating a driver installing method according to an exemplary embodiment of the present general inventive concept.

When the driver installation program part 100 is executed, the user interface part 112 displays the step-by-step setup screen 310 for installing the driver of the external device and the setup method screen 410 relating to the step-by-step setup screen 310 in the first region 300 and the second region 400 respectively (operation S500).

The user can select a desired option or the next step in the step-by-step setup screen 310 by referring to the setup method screen 410. As a result, the selection signal for the step-by-step setup screen 310 is input (operation S510).

The setup screens 310 from the user interface 112 are displayed in the display device 200 step by step, and the user inputs a selection signal in each step. Accordingly, the setup screens 310 are displayed step by step. When the last setup screen is completed, the driver installer 114 installs the driver to the storage part 120 of the host device in accordance with the selection signals (operation S520).

Figure 6:
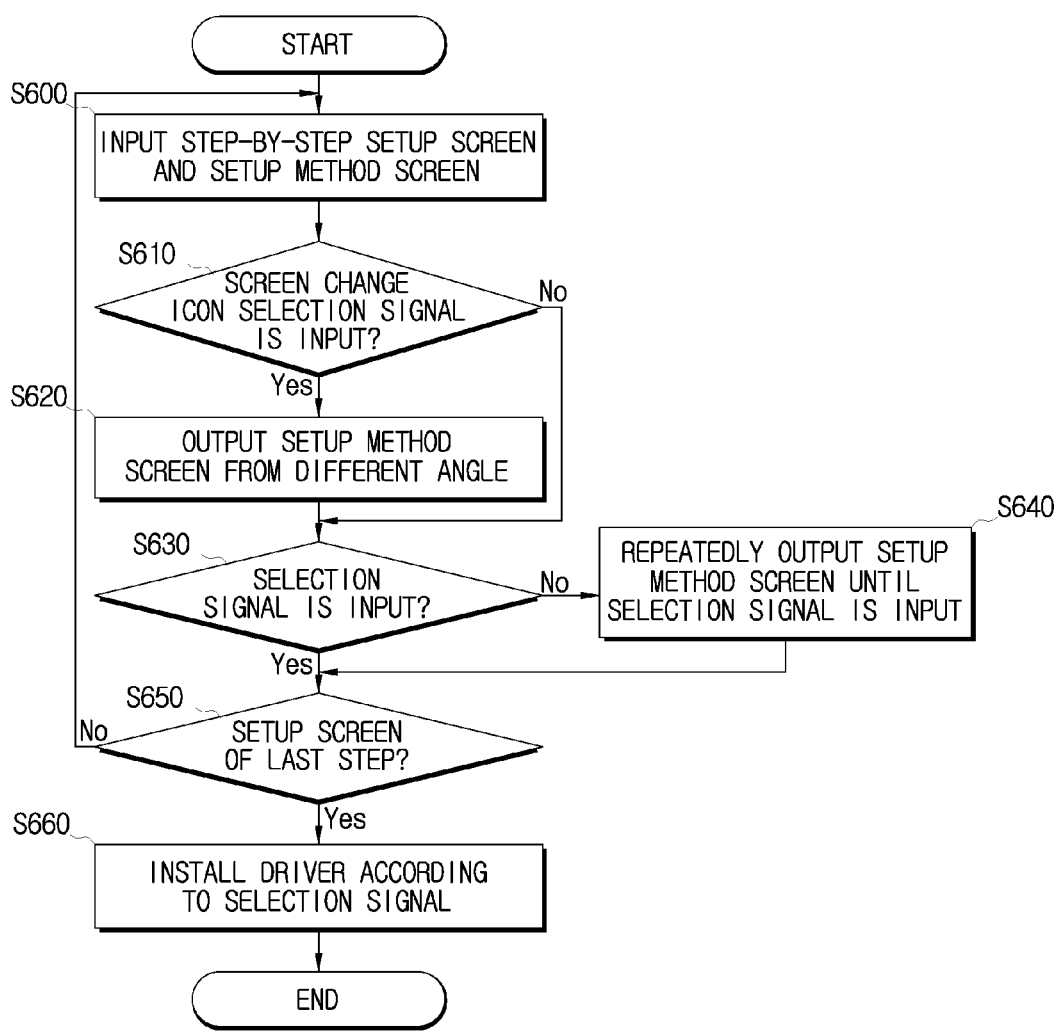
FIG. 6 is a flowchart illustrating a driver installing method according to another embodiment of the present general inventive concept.

FIG. 6 is a flowchart illustrating a driver installing method according to another exemplary embodiment of the present general inventive concept.

When the driver installation program part 110 is executed, the user interface 112 provides the step-by-step setup screen 310 and the setup method screen 410 relating to the step-by-step setup screen 310. Hence, the display device 200 displays the step-by-step setup screen 310 in the first region 300 and the setup method screen 410 relating to the step-by-step setup screen 310 in the second region 400 (operation S600).

As the step-by-step setup screen 310 and the setup method screen 410 are displayed in the first region 300 and the second region 400 respectively, the user can select the screen change icon 430 to learn the further detailed setup method of the current setup screen 310. When the screen change icon selection signal is input (operation S610—Yes), the user interface 112 displays the setup method screen from a different angle from the setup method screen 410 being displayed in the second region 400 (operation S620).

When the screen change icon selection signal is not input (S610—No), the driver installation program part 110 determines whether a certain selection signal is input through the user interface 112 (operation S630).

When the selection signal is input to the user interface 112 (operation S630—Yes), the driver installation program part 110 determines whether the current setup screen 310 displayed in the first region 300 is a setup screen of the last step (operation S650).

When the current setup screen 310 displayed in the first region 300 is the setup screen of the last step (operation S650—Yes), the driver installer 114 installs the driver according to the selection signal input in the step-by-step setup screen 310 (operation S660).

When no selection signal is input to the user interface 112 (operation S630—No), the user interface 112 repeatedly outputs the setup method screen 410 being currently displayed in the second region 400 until a selection signal is input (operation S640).

Next, when the selection signal is input to the user interface 112, the driver installation program part 110 determines whether the current setup screen 310 displayed in the first region 300 is a setup screen of the last step (operation S650). When the current setup screen 310 displayed in the first region 300 is the setup screen of the last step (operation S650—Yes), the driver installer 114 installs the driver according to the selection signal input in the step-by-step setup screen 310 (operation S660).

When the current setup screen 310 displayed in the first region 300 is not the setup screen of the last step (operation S650—No), operations S600 through S660 are repeated by displaying the next setup method and the next setup method screen of the next setup method.

Note that operations S600 through S660 can be performed by a computer-readable medium. The computer-readable medium can include every storage means readable by the host device 100. The present general inventive concept can also be embodied as computer-readable codes on a computer-readable medium. The computer-readable medium can contain computer-readable codes as a program to execute the above-described method, and include the computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and data transmitted over a network. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As set forth above, the host device for the driver installation and its driver installing method can lead the user to easily install the driver by displaying the setup method relating to the driver installation as the moving pictures in the separate window.

Although a few embodiments of the present general inventive concept have been shown and described, it will be appreciated by those skilled in the art that changes may be made in this embodiment without departing from the principles and spirit of the general inventive concept, the scope of which is defined in the appended claims and their equivalents.

What is claimed is:

1. A host device to install a driver, comprising:
   a user interface to generate a screen divided into a plurality of regions, to thereby display a step-by-step setup screen to install a driver of an external device in a first region of the divided regions and a setup method screen to inform at least one selection and at least one term of a setup method of the step-by-step setup screen in a second region of the divided regions, where the first region and second region are displayed at different angles from one another, and to receive a selection signal with respect to the step-by-step setup screen; and
   a driver installer to install the driver according to the selection signal input through the user interface.

2. The host device of claim 1, wherein the user interface provides the step-by-step setup screen in a form of an installation wizard for the driver installation.

3. The host device of claim 1, wherein the setup method screen includes one or more moving pictures to inform of a setup method relating to the step-by-step setup screen.

4. The host device of claim 1, wherein the user interface repeatedly displays a setup method screen relating to the step-by-step setup screen displayed in the first region when the selection signal for the step-by-step setup screen is not input.

5. The host device of claim 1, wherein the user interface further provides icons to select Maximize, Minimize, and Close with respect to the setup method screen in the second region.

6. The host device of claim 5, wherein the user interface extends and displays the setup method screen all over the first and second regions when the Maximize icon selection signal is input, and the user interface extends and displays the setup screen all over the first and second regions when either the Minimize icon or the Close icon selection signal is input.

7. The host device of claim 1, wherein the user interface displays a setup method screen to show hardware information of the external device from various angles when the step-by-step setup screen displayed in the first region relates to a hardware setup of the external device.

8. The host device of claim 7, wherein the user interface further provides a screen change icon to select to change the setup method screen when a screen change icon selection signal is input.

9. A driver installing method comprising:
   dividing a screen into a plurality of regions;
   displaying a step-by-step setup screen to install a driver of an external device in a first region of the divided regions and a setup method screen to inform at least one selection and at least one term of a setup method of the step-by-step setup screen in a second region of the divided regions where the first region and second region are displayed at different angles from one another;
   receiving a selection signal with respect to the step-by-step setup screen; and
   installing the driver in accordance to the input selection signal.

10. The driver installing method of claim 9, wherein the step-by-step setup screen is provided in a form of installation wizard for the driver installation.

11. The driver installing method of claim 9, wherein the setup method screen includes one or more moving pictures to inform of a setup method relating to the step-by-step setup screen.

12. The driver installing method of claim 9, further comprising:
   repeatedly displaying a setup method screen relating to the step-by-step setup screen displayed in the first region when the selection signal for the step-by-step setup screen is not input in the selection signal receiving operation.

13. The driver installing method of claim 9, wherein the providing of the step-by-step setup screen and the setup method screen comprises providing icons to select Maximize, Minimize, and Close with respect to the setup method screen in the second region.

14. The driver installing method of claim 13, wherein:
   the providing of the step-by-step setup screen and the setup method screen comprises extending and displaying the setup method screen to cover the first and second regions when the Maximize icon selection signal is input; and
   the providing of the step-by-step setup screen and the setup method screen comprises extending and displaying the setup screen to cover the first and second regions when either the Minimize icon or the Close icon selection signal is input.

15. The driver installing method of claim 9, wherein the providing of the step-by-step setup screen and the setup method screen comprises displaying a setup method screen to show hardware information of the external device from various angles when the step-by-step setup screen displayed in the first region relates to a hardware setup of the external device.

16. The driver installing method of claim 15, wherein:
the providing of the step-by-step setup screen and the setup method screen comprises providing a screen change icon to select to change the setup method screen; and
the providing of the step-by-step setup screen and the setup method screen when a screen change icon selection signal is input.

17. A non-transitory computer-readable recordable medium containing computer-readable codes as a program to perform a method of:
dividing a screen into a plurality of regions;
displaying a step-by-step setup screen to install a driver of an external device in a first region of the divided regions and a setup method screen to inform at least one selection and at least one term of a setup method of the step-by-step setup screen in a second region of the divided regions where the first region and second region are displayed at different angles from one another;
receiving a selection signal with respect to the step-by-step setup screen; and
installing the driver according to the selection signal input through the user interface.

18. A method of displaying a driver installation display, the method comprising:
displaying a screen having a plurality of regions; and
displaying a step-by-step setup screen to install a driver of an external device in a first region of the divided regions and a setup method screen to inform at least one selection and at least one term of a setup method of the step-by-step setup screen in a second region of the divided regions, where the first region and second region are displayed at different angles from one another.

19. A host apparatus to display a driver installation display of an external device, comprising:
a display apparatus to display a screen having a plurality of regions; and
a display interface to control a display of a step-by-step setup screen to install a driver of an external device in a first region of the divided regions and a setup method screen to inform at least one selection and at least one term of a setup method of the step-by-step setup screen in a second region of the divided regions, where the first region and second region are displayed at different angles from one another.

* * * * *